Patented Sept. 17, 1935

2,014,799

UNITED STATES PATENT OFFICE 2,014,799

DEXTRINIZATION OF GELATINIZED STARCH

Arthur D. Fuller, New Rochelle, N. Y., assignor to National Adhesives Corporation, New York, N. Y., a corporation of Delaware No Drawing. Application September 7, 1933, Serial No. 688,498

5 Claims. (Cl. 127—32)

This invention relates to the dextrinization of starch and has special reference to the dextrinizing of starch in a gelatinized form.

Methods of dextrinizing starch by heat or heat assisted by an acid catalyst are well known. The customary method in commercial practice of producing dextrines from starch is to incorporate an aqueous solution of a volatile acid with the starch and then roast the same in a dextrine cooker. It is also known to obtain cold water soluble starch products by heating the same to a gelatinized state. The present invention has for its main object the making of new types of dextrines and British gums by a process of producing a dried or dehydrated gelatinized starch and dextrinizing the same and obtaining a resulting dry dextrine product.

To prepare ordinary starch for dextrinization, the acid catalyst solution is dispersed throughout the starch particles usually by means of an atomizer. Ordinary commercial starch in the unswollen stage, as distinguished from gelatinized starch, produces a milk when mixed with water, whereas gelatinized starch on the other hand produces a colloidal paste. Therefore the incorporation of an aqueous solution of an acid catalyst while effective with ordinary commercial starch, causes manufacturing difficulties with gelatinized starch. Gelatinized starch has the tendency to form localized paste clots when an aqueous solution of volatile acid is atomized into it. These paste clots are dehydrated during the dextrinization stage and form an undesirable quantity of hard, gritty particles known as "tailings" which are both difficult and expensive to remove from the finished product.

One of the prime objects of my present invention centers about the provision of a method for dextrinizing starch in a gelatinized dry form. A more particular object of the invention is the provision of a method of gelatinizing starch and dextrinizing the same wherein a dextrinizing catalyzer is so incorporated into the gelatinized starch product as to obviate the above recited disadvantages and as to obtain a uniform and homogeneous dextrine product.

It is a further desideratum of the present invention to incorporate with the starch, prior to gelatinizing the same, a solution retarding agent which operates to render the gelatinized starch and the ultimate dextrine product less soluble, thereby permitting an even wetting of the gelatinized starch particles throughout the mass and preventing the formation of clots or lumps which would otherwise be produced as a result of an uneven wetting of the gelatinized starch particles, and thereby also permitting the temporary retarding of the dispersion of the starch particles when the mass is stirred in water by the consumer.

The method of the invention is practiced in steps or stages as follows:

Commercial starch (which contains of the order of 12% moisture) is first moistened so that its moisture content is approximately 25 to 30%. This moistened starch is then gelatinized by subjecting the same to heat, the heat acting on the moisture to burst the starch cells and gelatinize the starch material. During the heating the moisture content is again reduced to that of the normal moisture content of the starch.

The gelatinized starch material is put into a blending machine or may be directly loaded into the dextrine cookers and a dextrinizing catalyzer in gaseous form is then passed through the gelatinized starch mass. Chlorine gas is a preferred example of such a dextrinizing catalyzer. The chlorine gas combines with the moisture in the gelatinized starch to produce hypochlorous and hydrochloric acids, the hypochlorous acid being decomposed in the dextrine cooker to hydrochloric acid. In this way the gelatinized starch material may be acidulated without using an acid directly, and the dextrinizing catalyst is uniformly and homogeneously incorporated into the gelatinized starch material without forming any "tailings". The cooking may be carried on to produce any state of dextrinization.

To incorporate a solution retarder in the product, a substance is added to and mixed with the starch prior to the gelatinizing step which substance is of such a chemical and physical structure that it can be dried with the starch without affecting or modifying the starch. The substance is inert during the drying process except that it contains a large amount of water of crystallization in its chemical structure so that during the drying process the substance and the starch are simultaneously dried. Examples of such a substance are Epsom salts (MgSO$_4$—7H$_2$O)

and Glauber's salts (Na$_2$SO$_4$—10H$_2$O). During the drying, the reduction of the hydrated substance, either to the anhydrous state or to a lower hydrated condition, causes the starch granules to be coated with a film of the substance in its lower state of hydration. There results a temporary retarding of the dispersion of the starch particles when the mass is stirred in water and this temporary retarding effect permits an even wetting of the gelatinized starch particles throughout the mass and prevents the formation of clots or lumps which would otherwise be produced as a result of an uneven wetting or distribution of moisture in the gelatinized starch mass.

The solution retarder is also desirably selected of a substance which, in addition to its retarding effect, has another specific purpose, which is to anticipate the decrease in the pH value of the starch when the gelatinized starch is later subjected to the chlorine gas. The effect of the latter is to bring about a sharp increase in acidity. To anticipate this sharp increase of acidity, it is possible to use certain alkaline salts such as tri-sodium phosphate, sodium carbonate, sodium hydroxide, calcium hydroxide, or any other salts of the alkaline earth metals which have basic properties, for the purpose of causing to be retained in the gelatinized starch a sufficient amount of a compound having an alkaline reaction so that the same will react with the acid formed in the starch by the injection of the chlorine gas. The resultant pH value of the starch brought about by the reaction of this alkaline substance with the products of the dry chlorination make it possible to manufacture a wide range of dextrines and British gums when starch treated in the aforesaid manner is subjected to torrification.

The following is a specific example of the application of the invention:

2000 pounds of commercial starch are mixed with an equal amount by weight of water, the product of the mixture being a concentrated starch milk. The solution retarder is then intimately mixed with the starch milk, the solution retarder being added at this stage of the process in order to obtain the proper distribution thereof in the starch mass. From this concentrated milk the water is partially removed by a centrifuge or filter and the starch cake obtained is then heated in a dryer until the moisture content of the mass is about 30% more or less. In this heating stage precaution is taken to prevent the starch from gelatinizing.

The resulting semi-dehydrated starch is then charged into another dryer, the purpose of which is to gelatinize the starch simultaneously with the removing of an additional amount of water. To accomplish this, this semi-dehydrated starch is fed on to a highly heated metallic surface such as a metal roll internally heated with steam at about 150 pounds pressure. This causes the semi-dehydrated starch to form thin dried flakes of gelatinized starch on the surface of the heated roll during one revolution of the latter, which is removed by a scraping knife.

The dried flakes of gelatinized starch obtained are then ground to a fineness of preferably about 100 mesh and the ground product is transferred to a dextrinizing vessel. Here the catalyzer in gaseous form is introduced and the mass uniformly incorporated therewith. Sufficient moisture is contained in the gelatinized starch to react with chlorine gas, when the latter is used as the catalyzer, to produce the hydrochloric acid catalyst.

The amount of chorine gas used depends directly upon the type of end product desired. For white dextrines where a low temperature must be employed in the dextrinizing vessel, about one pound of chlorine gas per thousand pounds of gelatinized starch may be used. Where a yellow dextrine is desired as the end product, about a quarter pound of chlorine gas per thousand pounds of starch represents a suitable working quantity. It is therefore obvious that any amount of chorine gas can be employed in the range of from a fraction of a pound to even several pounds of chlorine gas per thousand pounds of gelatinized starch depending upon how much bleaching and oxidizing action is desired in addition to the necessary dextrinizing effect intended. When more than one pound of chlorine gas per thousand pounds of gelatinized starch is employed, the finished product might have some objectionable odor due to the use of the larger amount of chlorine, and in this case it is possible to incorporate chemicals with the chlorinated dextrine which will take up any residual chlorine still remaining so as to eliminate the objectionable odor.

The amount of solution retarder that may be used depends upon the end product desired and the substance employed. For the making of adhesives, a small amount of the solution retarding agent as, for example, from 1% to 3% by weight of the anhydrous starch is suitable. For the manufacture of sizes, larger quantities as, for example, 100% by weight of Epsom salts may be incorporated with the starch mass.

In place of chlorine gas other dextrinizing catalysts in gaseous form may be used. For example, hydrochloric acid gas has been found suitable for this purpose. Chlorine gas has been found very efficient for the intended purposes. The method may be carried on in any suitable apparatus. The incorporation of the catalyst in the gelatinized starch mass may be carried on in a blending machine prior to heating the mass in a dextrine cooker or may be carried on directly in the dextrine cooker or roaster. The conversion or dextrinization of the starch is carried out by the present process more readily than in prior processes because of the intimate treatment of the starch material itself, the starch cells having been burst in the gelatinizing stage of the process. It will be understood that in prior art processes, where the starch is acidulated, the starch cells are unbroken. It will be further understood that the invention is not limited to the production of any specific type of modified or dextrinized starch, the process of the invention being capable of producing a large number of starch degradation products.

By means of the method of my present invention, new types of dextrines and British gums are produced. There results from the process a dextrinized starch derivative characterized by the fact that even when it is not a fully converted dextrine or British gum, it will produce a strong adhesive paste by just mixing with cold water, differing from the standard dextrines and British gums commercially offered in that the commercial grades must be cooked with water to obtain strong adhesive pastes. In fact, British gums produced by the present method having a low dextrine content of only 10 or 20% can be made to disperse completely by just mixing with cold water, whereas a standard commercial grade of equivalent solubility or dextrine content has no adhesive qualities when just mixed with cold water. As to dextrines, while it is true that commercial dextrines can be made which are completely soluble in cold water, it is also a fact that in order to obtain the maximum adhesiveness from these products, it is necessary to cook even these completely soluble dextrines with water, whereas dextrines made by the process of the present invention can be used directly by the consumer by just mixing with cold water and even obtaining superior adhesive properties compared to the standard dextrines when cooked. Further important characteristics of the new products obtained are their uniform viscosity and unalterable fluidity. These properties are unique for dextrines and British gums. Dextrines and British gums made by other methods tend to thicken on aging and to thin down upon agitation as when subjected to machine agitation. The products of the present invention do not tend to thicken on aging but maintain a uniform viscosity and do not tend to thin down when employed in the arts and subjected to normal machine agitation, the fluidity being maintained unalterable. The products therefore provide not only for greater efficiency from the manufacturer's viewpoint, but greater convenience from the consumer's viewpoint.

I claim:

1. The gelatinization-dextrinization method which consists in heating moist starch to gelatinize the same, in reducing the product obtained to a dry powdery form, in incorporating a catalyzer with the thus dried powdered gelatinized starch, and in subjecting the latter to heat to dextrinize the same and produce a dry dextrine product.

2. The gelatinization-dextrinization method which consists in heating moist starch to gelatinize the same, in reducing the product obtained to a dry powdery form, in incorporating chlorine in gaseous form with the thus dried powdered gelatinized starch, and in subjecting the latter to heat to dextrinize the same and produce a dry dextrine product.

3. The gelatinization-dextrinization method which consists in mixing moist starch with a solution-retarding agent, in heating the starch mix to gelatinize the starch, in reducing the product obtained to a dry powdery form, and in subjecting the dried powdered gelatinized starch to heat to dextrinize the same and produce a dry dextrine product, the said solution-retarding agent acting to prevent lumping when the produced dextrine is mixed with water.

4. The gelatinization-dextrinization method which consists in mixing moist starch with a solution-retarding agent, in heating the starch mix to gelatinize the starch, in reducing the product obtained to a dry powdery form, in incorporating a catalyzer with the thus dried powdered gelatinized starch, and in subjecting the latter to heat to dextrinize the same and produce a dry dextrine product, the said solution-retarding agent acting to prevent lumping when the produced dextrine is mixed with water.

5. The gelatinization-dextrinization method which consists in mixing moist starch with a solution-retarding substance having basic properties, in heating the starch mix to gelatinize the starch, in reducing the product obtained to a dry powdery form, in incorporating chlorine in gaseous form with the thus dried powdered gelatinized starch, and in subjecting the latter to heat to dextrinize the same and produce a dry dextrine product, the said substance acting as a solution-retarding agent for the produced dextrine and as a base for reaction with the acid formed in the starch by the incorporation of the chlorine.

ARTHUR D. FULLER.